(12) United States Patent
Schroeder et al.

(10) Patent No.: US 10,909,136 B1
(45) Date of Patent: Feb. 2, 2021

(54) SYSTEMS AND METHODS FOR AUTOMATICALLY LINKING DATA ANALYTICS TO STORAGE

(71) Applicant: Veritas Technologies LLC, Mountain View, CA (US)

(72) Inventors: Ryan Schroeder, Roseville, MN (US); Aaron Christensen, Apple Valley, MN (US); Kirk Searls, Blairsville, GA (US)

(73) Assignee: Veritas Technologies LLC, Santa Clara, CA (US)

( * ) Notice: Subject to any disclaimer, the term of this patent is extended or adjusted under 35 U.S.C. 154(b) by 406 days.

(21) Appl. No.: 15/428,134

(22) Filed: Feb. 8, 2017

(51) Int. Cl.
*G06F 16/25* (2019.01)
*G06F 9/50* (2006.01)

(52) U.S. Cl.
CPC .......... *G06F 16/254* (2019.01); *G06F 9/5016* (2013.01)

(58) Field of Classification Search
CPC .. G06F 16/285; G06F 16/9535; G06F 16/221; G06F 16/24575; G06F 16/2462; G06F 16/248; G06F 16/252; G06F 16/258; G06F 16/438; G06F 16/00; G06F 16/13; G06F 16/14; G06F 16/16; G06F 16/172; G06F 16/2246; G06F 16/25; G06F 16/283; G06F 16/284; G06F 16/355; G06F 16/432; G06F 16/435; G06F 16/447; G06F 16/45; G06F 16/7867; G06F 16/9038; G06F 16/957; G06F 16/972; G06F 16/254; G06F 9/5016; G06F 16/182; G06F 16/27

USPC ......................................................... 707/602
See application file for complete search history.

(56) References Cited

U.S. PATENT DOCUMENTS

| | | | |
|---|---|---|---|
| 5,956,028 | A | 9/1999 | Matsui et al. |
| 7,702,866 | B2 | 4/2010 | Beardsley et al. |
| 8,266,616 | B1 | 9/2012 | Jacquot et al. |
| 8,869,140 | B2 | 10/2014 | Todorova |
| 9,075,638 | B2 | 7/2015 | Barnett et al. |
| 9,176,720 | B1 | 11/2015 | Day-Richter et al. |
| 9,203,862 | B1 | 12/2015 | Kashyap et al. |
| 9,213,541 | B2 | 12/2015 | Araya et al. |
| 9,256,467 | B1 | 2/2016 | Singh et al. |
| 9,367,305 | B1 | 6/2016 | Kumar |

(Continued)

OTHER PUBLICATIONS

Apache Mesos, http://mesos.apache.org, last accessed Jan. 25, 2017.

(Continued)

*Primary Examiner* — Alford W Kindred
*Assistant Examiner* — Cecile H Vo
(74) *Attorney, Agent, or Firm* — FisherBroyles, LLP

(57) ABSTRACT

The disclosed computer-implemented method for automatically linking data analytics to storage may include (1) identifying a request to provision storage for a data analytics task, (2) collecting information relating to the data analytics task, the information comprising at least one of a data type of the data being used as input for the data analytics task and a characteristic of the data analytics task, (3) using a self-service provisioning tool to automatically compute, based on the collected information, a suggested type and size of data storage for the data analytics task, and (4) automatically provisioning data storage for the data analytics task based on the suggested type and size. Various other methods, systems, and computer-readable media are also disclosed.

20 Claims, 6 Drawing Sheets

(56) References Cited

U.S. PATENT DOCUMENTS

| | | | |
|---|---|---|---|
| 9,396,061 B1* | 7/2016 | Nair | G06F 11/079 |
| 9,785,643 B1 | 10/2017 | Patil et al. | |
| 9,888,067 B1 | 2/2018 | Yemini et al. | |
| 9,983,891 B1 | 5/2018 | Christensen | |
| 10,073,974 B2 | 9/2018 | Hwang et al. | |
| 10,127,030 B1 | 11/2018 | Mortman et al. | |
| 10,169,023 B2 | 1/2019 | Ciano et al. | |
| 10,360,053 B1 | 7/2019 | Christensen et al. | |
| 2002/0069399 A1 | 6/2002 | Miloushey et al. | |
| 2002/0069400 A1 | 6/2002 | Miloushev et al. | |
| 2002/0120924 A1 | 8/2002 | Miloushev et al. | |
| 2003/0056205 A1 | 3/2003 | Miloushev et al. | |
| 2003/0135850 A1 | 7/2003 | Miloushev et al. | |
| 2004/0148367 A1 | 7/2004 | Takano | |
| 2005/0246357 A1* | 11/2005 | Geary | G06F 16/283 |
| 2006/0005189 A1 | 1/2006 | Vega et al. | |
| 2008/0028379 A1 | 1/2008 | Stichnoth | |
| 2009/0077422 A1 | 3/2009 | Khaladkar et al. | |
| 2009/0210869 A1 | 8/2009 | Gebhart | |
| 2009/0265712 A1 | 10/2009 | Herington | |
| 2011/0047525 A1 | 2/2011 | Castellanos | |
| 2011/0191537 A1 | 8/2011 | Kawaguchi et al. | |
| 2011/0197188 A1 | 8/2011 | Srinivasan | |
| 2012/0005153 A1* | 1/2012 | Ledwich | G06Q 10/10 707/602 |
| 2014/0181816 A1 | 6/2014 | Muller | |
| 2014/0201374 A1 | 7/2014 | Ashwood-Smith | |
| 2015/0032688 A1 | 1/2015 | Dayon et al. | |
| 2015/0120928 A1 | 4/2015 | Gummaraju | |
| 2015/0269006 A1 | 9/2015 | Caufield | |
| 2015/0310209 A1 | 10/2015 | Zhang | |
| 2015/0363181 A1 | 12/2015 | Alberti | |
| 2016/0004848 A1* | 1/2016 | Gocek | H04L 41/0286 726/26 |
| 2016/0098285 A1 | 4/2016 | Davis et al. | |
| 2016/0162320 A1 | 6/2016 | Singh | |
| 2016/0171222 A1 | 6/2016 | Panchbudhe et al. | |
| 2016/0182315 A1 | 6/2016 | Salokanto et al. | |
| 2016/0217176 A1 | 7/2016 | Haviv et al. | |
| 2016/0359955 A1 | 12/2016 | Gill et al. | |
| 2016/0378518 A1 | 12/2016 | Antony | |
| 2017/0060605 A1 | 3/2017 | Huang et al. | |
| 2017/0083541 A1 | 3/2017 | Mann et al. | |
| 2017/0115977 A1 | 4/2017 | Kim | |
| 2017/0154017 A1 | 6/2017 | Kristiansson et al. | |
| 2017/0228246 A1 | 8/2017 | Kotha | |
| 2017/0235609 A1 | 8/2017 | Wires | |
| 2017/0242617 A1 | 8/2017 | Walsh | |
| 2017/0249469 A1 | 8/2017 | Goyal et al. | |
| 2017/0264684 A1 | 9/2017 | Spillane | |
| 2017/0277524 A1 | 9/2017 | Bhat et al. | |
| 2017/0279797 A1 | 9/2017 | Cross, Jr. | |
| 2017/0315795 A1 | 11/2017 | Keller | |
| 2017/0322966 A1 | 11/2017 | Tran | |
| 2017/0337054 A1 | 11/2017 | Parees | |
| 2017/0344292 A1 | 11/2017 | Sterin | |
| 2018/0004570 A1 | 1/2018 | Maupu | |
| 2018/0046457 A1 | 2/2018 | Branca | |
| 2018/0060402 A1 | 3/2018 | Fabjanski et al. | |
| 2018/0129479 A1 | 5/2018 | McPherson et al. | |
| 2018/0157505 A1 | 6/2018 | Kairali et al. | |
| 2018/0336113 A1 | 11/2018 | Asawa et al. | |

OTHER PUBLICATIONS

AWS Lambda, https://aws.amazon.com/lambda/, last accessed Jan. 25, 2017.

Docker container support, last accessed Jan. 25, 2017.

Dray—Docker Workflow Engine, http://dray.it/, last accessed Jan. 25, 2017.

Docker ETL Rest server github, https://github.com/bmamlin/docker-etl-rest-server, last accessed Jan. 25, 2017.

Docker Nifi github, https://github.com/jdye64/docker-nifi, last accessed Jan. 25, 2017.

Mesos/Chronos github, https://github.com/mesos/chronos, last accessed Jan. 25, 2017.

Apache Nifi for Docker, https://github.com/apiri/dockerfile-apache-nifi, last accessed Jan. 25, 2017.

Coho Data, https://www.cohodata.com/intel, last accessed Jan. 25, 2017.

Iron.io, https://www.iron.io/, last accessed Jan. 25, 2017.

Jenkins and Docker, https://www.cloudbees.com/continuous-delivery/jenkins-docker, last accessed Jan. 25, 2017.

Pachyderm.io, https://www.pachyderm.io/, last accessed Jan. 25, 2017.

Syncsort ETL, last accessed Jan. 25, 2017.

Talend and Docker, last accessed Jan. 25, 2017.

What is Docker?, https://www.docker.com/what-docker, last accessed Jan. 25, 2017.

Docker Swarm product overview, https://www.docker.com/products/docker-swarm, last accessed Feb. 28, 2017.

Kubernetes Basics, https://kubernetes.io/docs/tutorials/kubernetes-basics/, last accessed Feb. 28, 2017.

Attach a volume to a container while it is running; http://jpetazzo.github.io/2015/01/13/docker-mount-dynamic-volumes/, as accessed Feb. 23, 2017 (Jan. 13, 2015); Github.

Manage data in containers; https://docs.docker.com/engine/tutorials/dockervolumes/#/backup-restore-or-migrate-data-volumes, as accessed Feb. 23, 2017 (Sep. 3, 2016); Docker.

Docker—Data Volumes and Data Containers (4); http://www.tricksofthetrades.net/2016/03/14/docker-data-volumes/, as accessed Feb. 23, 2017 (Mar. 14, 2016); Tricks of the Trades.

Understanding Volumes in Docker; http://container-solutions.com/understanding-volumes-docker/, as accessed Feb. 23, 2017 (Jul. 6, 2015); Container Solutions Amsterdam.

Docker mounting volumes on host; http://stackoverflow.com/questions/25311613/docker-mounting-volumes-on-host, as accessed Feb. 23, 2017 (Aug. 14, 2014); stackoverflow.

Understand images, containers, and storage drivers; https://docs.docker.com/engine/userguide/storagedriver/imagesandcontainers/, as accessed Feb. 23, 2017 (Nov. 7, 2015); Docker.

A Not Very Short Introduction to Docker; https://blog.jayway.com/2015/03/21/a-not-very-short-introduction-to-docker/, as accessed Feb. 23, 2017 (Mar. 21, 2015); jayway.

Use data volume containers; https://getcarina.com/docs/tutorials/data-volume-containers/, as accessed Feb. 23, 2017 (Oct. 23, 2015); Rackspace.

What is the differences between Data Scientist Workbench and Knowledge Anyhow Workbench; http://support.datascientistworkbench.com/knowledgebase/articles/738753-what-is-the-differences-between-data-scientist-wor, as accessed Feb. 14, 2017 (Jan. 13, 2016); Big Data University.

Rodeo Basics; http://rodeo.yhat.com/docs/, as accessed Feb. 14, 2017 (Nov. 14, 2015); Rodeo.

Extract, transform, load; https://en.wikipedia.org/wiki/Extract,_transform,_load, as accessed Feb. 14, 2017 (Aug. 15, 2004); Wikipedia.

What is Docker; http://searchitoperations.techtarget.com/definition/Docker; as accessed Jan. 28, 2017.

Platform as a Service; https://en.wikipedia.org/wiki/Platform_as_a_service; as accessed Jan. 28, 2017.

What is Scale out Storage; http://whatis.techtarget.com/definition/scale-out-storage; as accessed Jan. 28, 2017.

Real-Time Data Analysis with Kubernetes, Redis, and BigQuery; https://cloud.google.com/solutions/real-time/kubernetes-redis-bigquery; as accessed Jan. 28, 2017.

Operating-system-level virtualization; https://en.wikipedia.org/wiki/Operating-system-level_virtualization; as accessed Jan. 28, 2017.

Advanced Analytics Products; http://www.sas.com/en_us/software/analytics.html#view-all-products; as accessed Jan. 31, 2017.

Containerized Cloud Analytics—SAS Analytics for Containers; http://www.sas.com/en_us/software/analytics-for-containers.html; as accessed Jan. 31, 2017.

Container Cluster; https://cloud.google.com/container-engine/docs/clusters/#what_is_a_container_cluster; as accessed Jan. 31, 2017.

Object Storage; https://en.wikipedia.org/wiki/Object_storage; as accessed Jan. 30, 2017.

(56) References Cited

OTHER PUBLICATIONS

Clustered file system; https://en.wikipedia.org/wiki/Clustered_file_system; as accessed Jan. 30, 2017.
Ryan Schroeder et al.; Systems and Methods for Automatically Linking Data Analytics to Storage; U.S. Appl. No. 15/428,134, filed Feb. 8, 2017.
Wikipedia; Operating-system-level virtualization; https://en.wikipedia.org/wiki/Operating-system-level_virtualization, as accessed on Feb. 14, 2017.
Plugins_volume.md; https://github.com/docker/docker/blob/master/docs/extend/plugins_volume.md, as accessed on Feb. 14, 2017.
Ryan Schroeder et al.; Systems and Methods for Performing Storage Location Virtualization; U.S. Appl. No. 15/432,614, filed Feb. 14, 2017.
Kirk Searls et al.; Systems and Methods for Building an Extract, Transform, Load Pipeline; U.S. Appl. No. 15/431,971, filed Feb. 14, 2017.
Kang et al., "Container and Microservice Driven Design for Cloud Infrastructure DevOps", IEEE International Conference on Cloud Engineering (IC2E), 2016, pp. 202-211.
Kasireddy, Preethi, "A Beginner-Friendly Introduction to Containers, VMs and Docker," URL: https://medium.freecodecamp.org/a-beginner-friendly-introduction-to-containers-vms-and-docker-79a9e3e119b, Mar. 4, 2016, 21 pages.

\* cited by examiner

SYSTEMS AND METHODS FOR AUTOMATICALLY LINKING DATA ANALYTICS TO STORAGE

BACKGROUND

Often, data analysts need data storage to perform data analytics. For example, an analyst may need "scratch space" to hold intermediate results. Similarly, an analyst may need storage to hold a copy of the data being analyzed if the original data is not available (e.g., if the original data lives on a production system or a heavily-burdened shared server). However, it may often be the case that an analyst is not familiar with the details of storage. The analyst may not know the amount and/or type of storage that is needed to perform the desired analytics. Similarly, the analyst may not know how to provision storage and/or may not have permission to do so. The instant disclosure, therefore, identifies and addresses a need for systems and methods for automatically linking data analytics to storage.

SUMMARY

As will be described in greater detail below, the instant disclosure describes various systems and methods for automatically linking data analytics to storage. In one example, a computer-implemented method for automatically linking data analytics to storage may include (1) identifying a request to provision storage for a data analytics task, (2) collecting information relating to the data analytics task, the information including a data type of the data being used as input for the data analytics task and/or a characteristic of the data analytics task, (3) using a self-service provisioning tool to automatically compute, based on the collected information, a suggested type and size of data storage for the data analytics task, and (4) automatically provisioning data storage for the data analytics task based on the suggested type and size. In one embodiment, the request to provision storage for the data analytics task may include a request to provision containers within a container-based environment.

In one embodiment, automatically provisioning the data storage for the data analytics task may include creating storage of the suggested type and amount and connecting the storage to containers to be used for the data analytics task. In one embodiment, the request to provision storage for the data analytics task may include a request to provision scratch space to hold intermediate analytic results and/or storage for copy data.

In some examples, receiving the request to provision storage for the data analytics task may include receiving the request from an analyst via user input submitted by the analyst and/or receiving the request from a data analytics tool being used to perform the data analytics task. In on example, receiving the request to provision storage for the data analytics task may include inferring the request in response to determining that an analyst has digitally initiated a task that requires data storage.

In one embodiment, the steps of the method may be performed by a self-service provisioning tool and/or a data analytics tool. In some examples, collecting information relating to the data analytics task may include collecting the information in response to prompting a user to submit the information.

In some examples, collecting information relating to the data analytics task may include inferring the information based on attributes of the data analytics task and/or a data analytics tool being used to perform the data analytics task.

In one embodiment, the data type of the data may include (1) a file format of the data, (2) a structure of the data, and/or (3) a source of the data.

In one embodiment, the characteristic of the data analytics task may include (1) a type of data analytics being performed, (2) a feature of the code used by a data analytics application performing the data analytics task, (3) a programming language of the data analytics application, (4) extract, transform, and load (ETL) functions to be performed as part of the data analytics task, and/or (5) an amount of data to be ingested for the data analytics task.

In one embodiment, the suggested type of data storage may include (1) an object store, (2) a network filesystem, and/or (3) a container-based storage system. In one embodiment, the computer-implemented method may further include, after computing the suggested type and size of data storage, presenting the suggested type and size of data storage to an analyst via a display element of a device associated with the analyst. In this embodiment, the computer-implemented method may further include, after presenting the suggested type and size of data storage, allowing the analyst to adjust one or more settings associated with the suggested type and/or the suggested size and automatically provisioning the data storage may be further based on the analyst's adjustments. In some examples, the computer-implemented method may further include altering one or more specifications of the self-service provisioning tool based on the analyst's adjustments. In one embodiment, automatically provisioning the data storage for the data analytics task may include provisioning data storage of the suggested type and size without requiring user input.

In one embodiment, a system for implementing the above-described method may include (1) an request module, stored in memory, that identifies a request to provision storage for a data analytics task, (2) a collection module, stored in memory, that collects information relating to the data analytics task, the information including a data type of the data being used as input for the data analytics task and/or a characteristic of the data analytics task, (3) a computation module, stored in memory, that uses a self-service provisioning tool to automatically compute, based on the collected information, a suggested type and size of data storage for the data analytics task, (4) a provisioning module, stored in memory, that automatically provisions data storage for the data analytics task based on the suggested type and size, and (5) at least one physical processor configured to execute the request module, the collection module, the computation module, and the provisioning module.

In some examples, the above-described method may be encoded as computer-readable instructions on a non-transitory computer-readable medium. For example, a computer-readable medium may include one or more computer-executable instructions that, when executed by at least one processor of a computing device, may cause the computing device to (1) identify a request to provision storage for a data analytics task, (2) collect information relating to the data analytics task, the information including a data type of the data being used as input for the data analytics task and/or a characteristic of the data analytics task, (3) use a self-service provisioning tool to automatically compute, based on the collected information, a suggested type and size of data storage for the data analytics task, and (4) provision data storage for the data analytics task based on the suggested type and size.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of example embodiments and are a part of the specification. Together with the following description, these drawings demonstrate and explain various principles of the instant disclosure.

Figure 1:
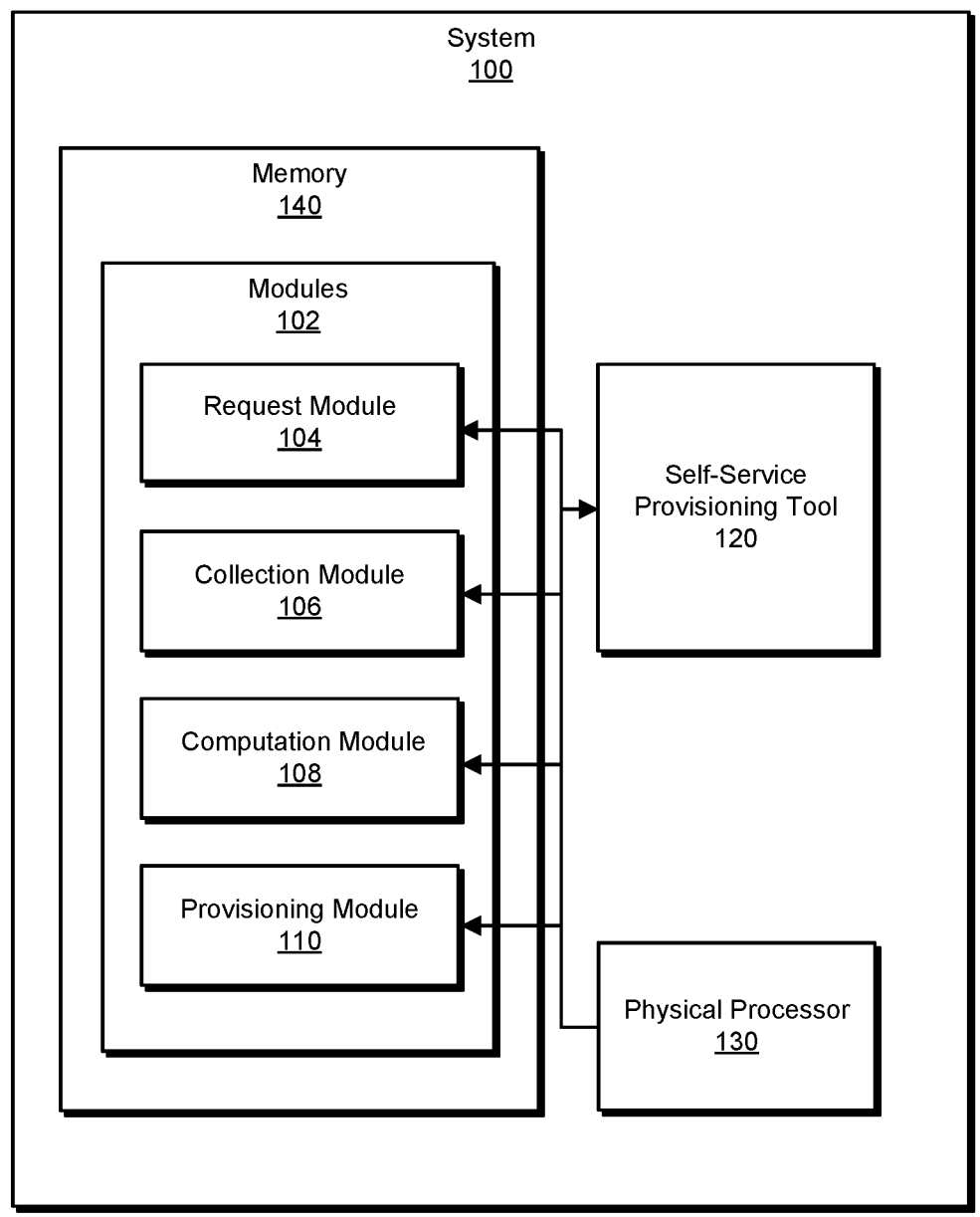
FIG. 1 is a block diagram of an example system for automatically linking data analytics to storage.

Throughout the drawings, identical reference characters and descriptions indicate similar, but not necessarily identical, elements. While the example embodiments described herein are susceptible to various modifications and alternative forms, specific embodiments have been shown by way of example in the drawings and will be described in detail herein. However, the example embodiments described herein are not intended to be limited to the particular forms disclosed. Rather, the instant disclosure covers all modifications, equivalents, and alternatives falling within the scope of the appended claims.

DETAILED DESCRIPTION OF EXAMPLE EMBODIMENTS

The present disclosure is generally directed to systems and methods for automatically linking data analytics to storage. As will be described in greater detail below, the systems and methods provided herein improve storage provisioning for analytics that use containers (e.g., in a scale-out system). In some examples, the disclosed systems and methods include using a self-service suggestion engine to provision storage for data analytics. In some examples, the self-service suggestion engine may receive user input describing (1) a characteristic of the data being ingested for the data analytics and (2) a characteristics of the data analytics being performed. Then, based on the user input, the self-service suggestion engine may suggest a type and amount of storage for the data analytics, thereby removing the burden of doing so from an analyst. In some examples, the self-service suggestion engine may have tailored the suggested type and amount of storage to the needs of the data analytics based on the information collected from the user input.

Often, data analysts are not familiar with the details of storage (e.g., what type or how much is needed). Furthermore, data analysts may not know how to provision storage and/or may not have permission to do so. As such, by providing an engine that automates provisioning storage for analytics based on information about the type of analytics being performed and the type of data being ingested (information that a data analyst is likely to be familiar with), the disclosed systems and methods may simplify and improve the data provisioning process for data analytics. In addition, the systems and methods may also improve the field of data analytics by tailoring the storage allotted to data analytic tasks to the needs of the tasks.

Figure 2:
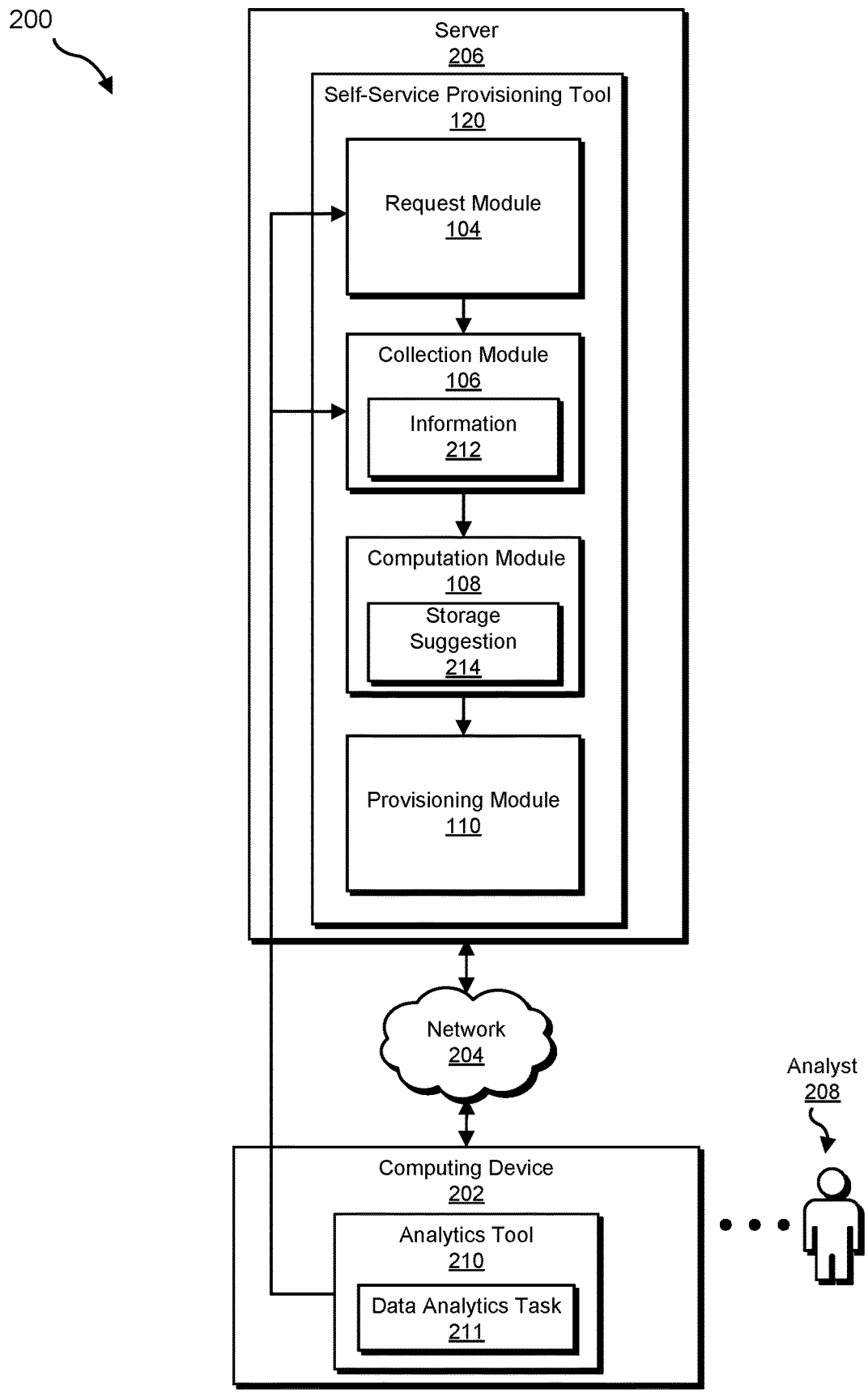
FIG. 2 is a block diagram of an additional example system for automatically linking data analytics to storage.
Figure 3:
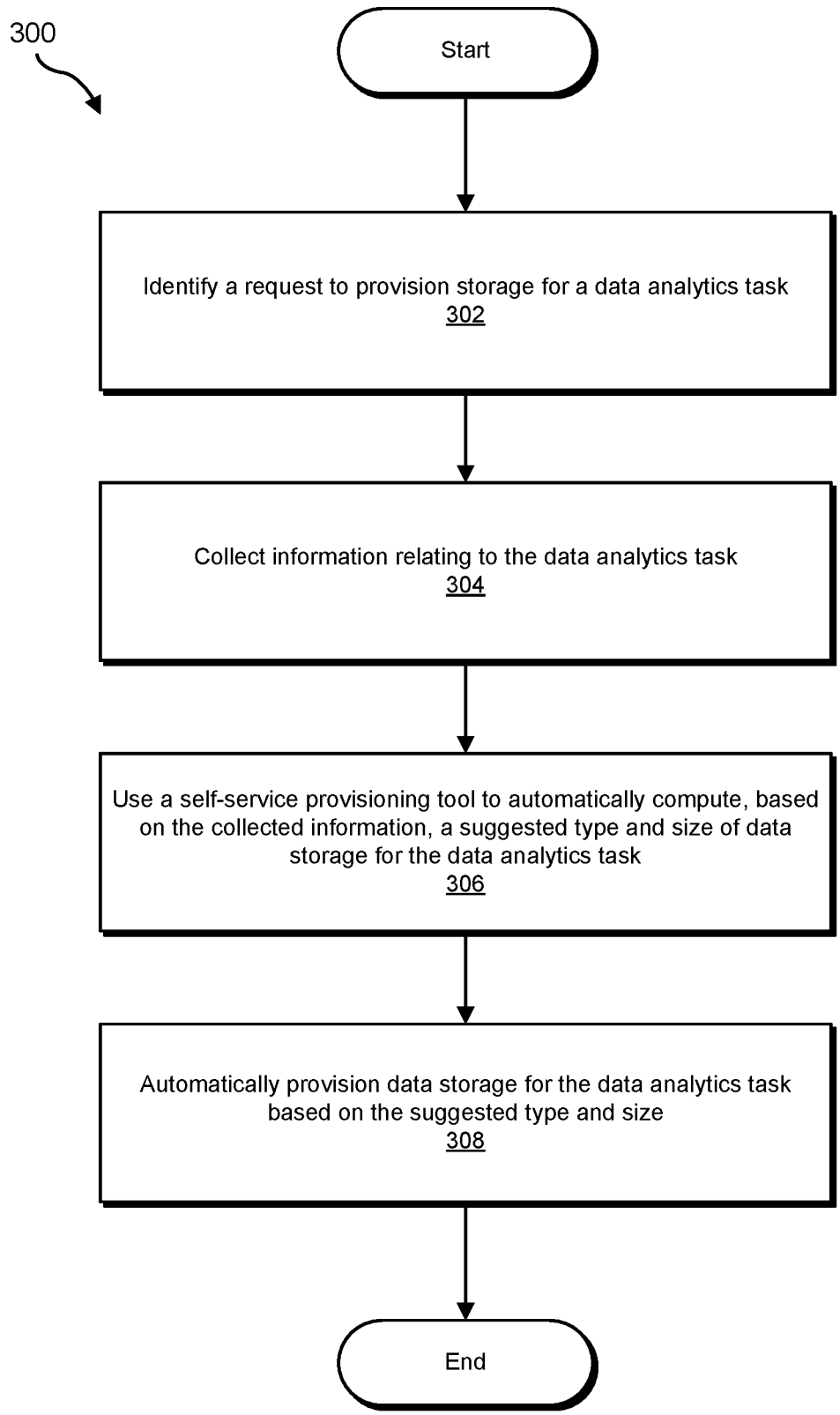
FIG. 3 is a flow diagram of an example method for automatically linking data analytics to storage.
Figure 4:
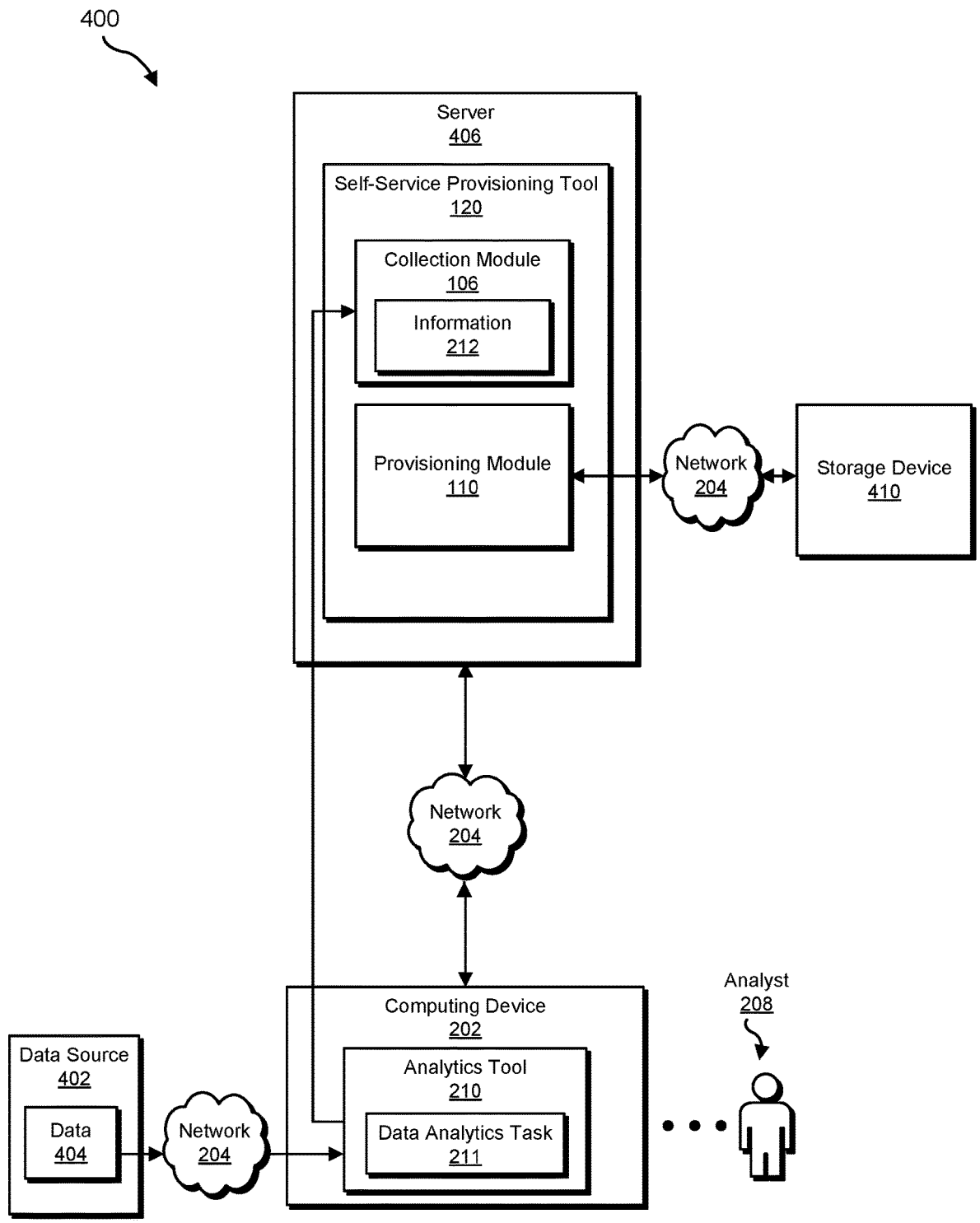
FIG. 4 is a block diagram of an additional example system for automatically linking data analytics to storage.

The following will provide, with reference to FIGS. 1-2 and FIG. 4, detailed descriptions of example systems for automatically linking data analytics to storage. Detailed descriptions of corresponding computer-implemented methods will also be provided in connection with FIG. 3. In addition, detailed descriptions of an exemplary computing system and network architecture capable of implementing one or more of the embodiments described herein will be provided in connection with FIGS. 5 and 6, respectively.

FIG. 1 is a block diagram of exemplary system 100 for automatically linking data analytics to storage. As illustrated in this figure, exemplary system 100 may include one or more modules 102 for performing one or more tasks. For example, and as will be explained in greater detail below, exemplary system 100 may include a request module 104 that identifies a request to provision storage for a data analytics task. Exemplary system 100 may additionally include a collection module 106 that collects information relating to the data analytics task. Exemplary system 100 may also include a computation module 108 that uses a self-service provisioning tool 120 to automatically compute, based on the collected information, a suggested type and size of data storage for the data analytics task. Exemplary system 100 may additionally include a provisioning module 110 that provisions data storage for the data analytics task based on the suggested type and size. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent modules stored and configured to run on one or more computing devices, such as the devices illustrated in FIG. 2 (e.g., computing device 202 and/or server 206) and/or the devices illustrated in FIG. 4 (e.g., storage device 410). In some examples, one or more of modules 102 may operate as part of a self-service provisioning tool (e.g., self-service provisioning tool 120). Additionally or alternatively, one or more of modules 102 may operate as part of a data analytics program (e.g., analytics tool 210). One or more of modules 102 in FIG. 1 may also represent all or portions of one or more special-purpose computers configured to perform one or more tasks.

As illustrated in FIG. 1, example system 100 may also include one or more memory devices, such as memory 140. Memory 140 generally represents any type or form of volatile or non-volatile storage device or medium capable of storing data and/or computer-readable instructions. In one example, memory 140 may store, load, and/or maintain one or more of modules 102. Examples of memory 140 include, without limitation, Random Access Memory (RAM), Read Only Memory (ROM), flash memory, Hard Disk Drives, (HDDs), Solid-State Drives (SSDs), optical disk drives, caches, variations or combinations of one or more of the same, and/or any other suitable storage memory.

As illustrated in FIG. 1, example system 100 may also include one or more physical processors, such as physical processor 130. Physical processor 130 generally represents any type or form of hardware-implemented processing unit capable of interpreting and/or executing computer-readable instructions. In one example, physical processor 130 may access and/or modify one or more of modules 102 stored in memory 140. Additionally or alternatively, physical processor 130 may execute one or more of modules 102 to facilitate automatically linking data analytics to storage. Examples of physical processor 130 include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, and/or any other suitable physical processor.

As illustrated in FIG. 1, example system 100 may also include self-service provisioning tool 120. Self-service provisioning tool 120 generally represents any type or form of application for provisioning data storage for analytics (e.g., containerized cloud analytics). In one example, self-service provisioning tool 120 may represent a suggestion engine configured to suggest a size and type of storage for data analytics based on information accessible to self service provisioning tool 120 (e.g., information such as the type of data that is being used as input for the analytics, and/or a characteristic of the analytics being performed on the data). In some examples, self-service provisioning tool 120 may operate as part of an analytics tool and/or service. In other examples, self-service provisioning tool 120 may operate as part of a third-party platform supporting the analytics tool and/or service. In one example, self-service provisioning tool 120 may operate as part of a storage platform to be used for the analytics.

Example system 100 in FIG. 1 may be implemented in a variety of ways. For example, all or a portion of example system 100 may represent portions of example system 200 in FIG. 2. As shown in FIG. 2, system 200 may include a computing device 202 in communication with a server 206 via a network 204. In one example, all or a portion of the functionality of modules 102 may be performed by computing device 202, server 206, and/or any other suitable computing system. As will be described in greater detail below, one or more of modules 102 from FIG. 1 may, when executed by at least one processor of computing device 202 and/or server 206, enable computing device 202 and/or server 206 to automatically link data analytics to storage.

For example, and as will be described in greater detail below, request module 104 may identify a request to provision storage for a data analytics task 211. Collection module 106 may collect information 212 relating to data analytics task 211. Computation module 108 may use a self-service provisioning tool 120 to automatically compute, based on the collected information 212, a storage suggestion 214 including a suggested type and size of data storage for data analytics task 211. Then, provisioning module 110 may provision data storage for data analytics task 211 based on storage suggestion 214.

Computing device 202 generally represents any type or form of computing device capable of reading computer-executable instructions. In one example, computing device 202 may be configured to perform data analytics including, for example, data analytics task 211. In one example, computing device 202 may be configured with data analytics software. For example, computing device 202 may include an analytics tool 210 used (e.g., by an analyst 208) to perform the data analytics. Additional examples of computing device 202 include, without limitation, laptops, tablets, desktops, servers, cellular phones, Personal Digital Assistants (PDAs), multimedia players, embedded systems, variations or combinations of one or more of the same, and/or any other suitable computing device.

Server 206 generally represents any type or form of computing device that is capable of provisioning storage for data analytics. Additional examples of server 206 include, without limitation, application servers, web servers, storage servers, and/or database servers configured to run certain software applications and/or provide various analytics, web, storage, and/or database services. Although illustrated as a single entity in FIG. 2, server 206 may include and/or represent a plurality of servers that work and/or operate in conjunction with one another.

Network 204 generally represents any medium or architecture capable of facilitating communication or data transfer. In one example, network 204 may facilitate communication between computing device 202 and server 206. In this example, network 204 may facilitate communication or data transfer using wireless and/or wired connections. Examples of network 204 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), portions of one or more of the same, variations or combinations of one or more of the same, and/or any other suitable network.

In additional or alternative examples, network 204 may facilitate communication between computing device 202 and one or more remote data sources of data to be used for the data analytics managed via computing device 202. In additional or alternative examples, network 204 may facilitate communication between server 206 and a remote storage device used to store data relating to a data analytics task while the data analytics task is being performed and/or after the data analytics task is completed. Although illustrated as a single entity in FIG. 2 (and, as will be discussed later, in FIG. 4), network 204 may include and/or represent a plurality of networks.

FIG. 3 is a flow diagram of an example computer-implemented method 300 for automatically linking data analytics to storage. The steps shown in FIG. 3 may be performed by any suitable computer-executable code and/or computing system, including system 100 in FIG. 1, system 200 in FIG. 2, system 400 in FIG. 4, and/or variations or combinations of one or more of the same. In one example, each of the steps shown in FIG. 3 may represent an algorithm whose structure includes and/or is represented by multiple sub-steps, examples of which will be provided in greater detail below.

As illustrated in FIG. 3, at step 302, one or more of the systems described herein may identify a request to provision storage for a data analytics task. For example, request module 104 may, as part of server 206 in FIG. 2, identify a request to provision storage for data analytics task 211.

As used herein, the term "data analytics" generally refers to any type or form of qualitative and/or quantitative technique and/or process for analyzing data. In some examples, data analytics may refer to the process of extracting and categorizing data to identify and/or analyze behavioral data and/or patterns in the data. Examples of data analytics task 211 may include, without limitation, data mining, text analytics, and/or predictive modeling. The data analytics described herein may be performed for a variety of purposes including, without limitation, enhancing productivity and business gain, understanding social trends, market trends, and/or hidden patterns, and/or discerning user preferences and/or community interests.

In some examples, the data analytics described herein may be performed using a data analytics program such as analytics tool 210 (e.g., provided by a data analytics service, such as KNIME, SAS, and/or DATA APPLIED). In one example, the data analytics disclosed herein may be configured to operate within a cloud-based container-enabled environment for data processing. In this example, the data analytics program (e.g., analytics tool 210) may operate within a container of the container-enabled environment. In examples in which analytics tool 210 examines large data sets (e.g., big data analytics), the container-enabled environment may further represent a clustered environment. In these examples, the clustered environment may include a group of multiple clustered containers with a single master endpoint that provides an analyst (such as analyst 208) with a unified view into the cluster.

The term "container," as used herein, generally refers to any type of virtual environment that does not include an entire operating system but does include enough computing resources to execute at least one process and/or application. In some embodiments, the resources and/or processes within an application container may be isolated from resources and/or processes outside the application container. For example, a container may isolate user space of an analytics system from other software on the analytics system while sharing kernel space with the other software. The term "user space," as used herein, generally refers to the portion of memory in a computing environment where application software executes. In some embodiments, user space may include libraries, graphics engines, device drivers for certain devices, and/or system daemons. The term "kernel space," as used herein, generally refers to the portion of memory in a computing environment reserved for executing an operating system kernel, kernel extensions, and device drivers. In contrast, virtualization environments that are not containers, such as virtual machines, may not share kernel space with other software. Other forms of application virtualization that are also not containers may share both kernel space and user space with other applications. In some embodiments, a container may execute only a single process and/or application, while in other embodiments, a container may execute multiple processes and/or applications.

Data analytics task 211 may require data storage for a variety of reasons. In some examples, data analytics task 211 may require scratch space to hold intermediate analytic results. Additionally or alternatively, data analytics task 211 may require storage for copy data. In one example, data analytics task 211 may require storage to maintain one or more results of completing data analytics task 211. In some examples, data analytics task 211 may require varying amounts of storage at various moments in time over the course of completing data analytics task 211.

Request module 104 may identify the request to provision storage in a variety of ways. In some examples, request module 104 may receive user input from data analyst 208 (e.g., from a peripheral auxiliary device such as a keyboard) that requests the storage provisioning directly. For example, request module 104 may operate as part of self-service provisioning tool 120 and analyst 208 may submit the request by accessing self-service provisioning tool 120 and submitting the request. Additionally or alternatively, request module 104 may receive the request from an application (such as analytics tool 210) and/or from a data analytics service being used by analyst 208 to complete data analytics task 211.

In other examples, request module 104 may infer the request for storage provisioning. In one such example, request module 104 may be integrated with analytics tool 210 and/or with an analytics service and may infer the request based on the digital activity of analyst 208 completed within analytics tool 210 and/or with the analytics service. For example, request module 104 may determine that analyst 208 has accessed analytics tool 210 and/or the analytics service and infer the request based on that determination. Similarly, request module 104 may determine that analyst 208 has initiated a task (e.g., data analytics task 211) that requires data storage. In this example, request module 104 may infer the request for provisioning data storage based on determining that analyst 208 has initiated a task that requires data storage.

In some examples, the request for provisioning storage may include and/or imply a request for provisioning storage that is compatible with an environment of analytics tool 210. For example, in examples in which analyst 208 uses a containerized environment for data processing, the request for storage provisioning may include and/or imply a request for provisioning containers within the containerized environment.

At step 304, one or more of the systems described herein may collect information relating to the data analytics task, the information including a data type of the data being used as input for the data analytics task and/or a characteristic of the data analytics task. For example, collection module 106 may, as part of server 206 in FIG. 2, collect information 212. Information 212 may relate to a data type of the data being used as input for data analytics task 211 and/or a characteristic of data analytics task 211.

Collection module 106 may collect information 212 in a variety of ways. In some examples, collection module 106 may receive information 212 as user input (e.g., in response to prompting analyst 208 to provide information 212). Additionally or alternatively, collection module 106 may receive information 212 from a data analytics application and/or service, such as analytics tool 210.

In other examples, collection module 106 may collect information 212 by inferring information 212. For example, collection module 106 may identify (1) the data analytics task to be performed (e.g., data analytics task 211), and/or (2) an application and/or service being used to perform the data analytics task (e.g., analytics tool 210). Then, collection module 106 may infer information 212 based on known attributes and/or requirements of the data analytics task, the application, and/or the service.

Collection module 106 may collect a variety of information. In one example, collection module 106 may collect information describing a data type of the data being used as input for data analytics task 211. Collection module 106 may collect information indicating a data type of the data in a variety of ways. In some examples, collection module 106 may collect information indicating a file format of the data. To give a specific example, collection module 106 may collect information indicating that the data includes CSV files, APACHE PARQUET files, JPEG image files, plain text files, PDF files, etc. In additional or alternative examples, collection module 106 may collect information indicating a file structure of the data. To give a specific example, collection module 106 may collect information indicating that the data being used as input includes tabular data.

In additional or alternative examples, collection module 106 may collect information indicating a source of the data (e.g., a program and/or entity that created and/or maintains the data). To give a specific example, collection module 106 may collect information indicating that the data being used as input for data analytics task 211 includes data collected from a certain type of user account (e.g., TWITTER accounts). To give another specific example, collection module 106 may collect information indicating that the data being used as input is being stored using a particular platform (such as ORACLE, CASANDRA, etc.). To give another specific example, collection module 106 may collect information indicating that the data is being managed by a particular management system (e.g., a MYSQL management system).

In some examples, the data being used as input may reside on a server associated with analytics tool 210. In other examples, the data being used as input may reside in a remote database. For example, as shown in example system 400 in FIG. 4, analytics tool 210 may obtain data 404 (to be used as input for data analytics task 211) from a remote data source 402 (e.g., via an instance of network 204).

In certain embodiments, after identifying the data type of the data, collection module 106 may additionally collect information describing a characteristic of the identified data type. For example, collection module 106 may collect information that indicates a characterization of an identified source of the data. Using FIG. 4 as a specific example, collection module 106 may determine that data source 402 represents a heavily burdened shared server and/or production system. From this determination, collection module 106 may infer that the data-in-place (i.e., data 404) may not be used such that copy data (and storage space to accommodate such copy data) will be needed to perform data analytics task 211.

In addition (or as an alternative) to collecting information describing a data type of the data being used as input for data analytics task 211, collection module 106 may collect information describing a characteristic of data analytics task 211.

Collection module 106 may collect information indicating a characteristic of data analytics task 211 in a variety of ways. In one example, collection module 106 may collect information indicating a type of data analytics being performed by data analytics task 211. For example, collection module 106 may collect information indicating that data analytics task 211 includes a sentiment analysis.

In another example, collection module 106 may collect information indicating a requirement of data analytics task 211 and/or a requirement of a data analytics application (e.g., analytics tool 210) being used to perform data analytics task 211. For example, data analytics task 211 (and/or analytics tool 210) may require storage that is compatible with certain applications, programming languages, and/or environments, such as APACHE SPARK, R, PYTHON, EXCEL, etc. In one embodiment, collection module 106 may collect information about the programming language and/or code used by the data analytics application performing data analytics task 211. For example (e.g., if the data analytics application uses PYTHON), collection module 106 may determine a number of "write to file" steps included in the code and/or whether there are loops in the code.

In some examples, collection module 106 may collect information indicating an ETL to be performed as part of data analytics task 211 (e.g., the extract, transform, and load functions to be used to extract, transform, and load the data being used as input). For example, collection module 106 may determine that data analytics task 211 requires extracting tarred, zipped files. In one embodiment, collection module 106 may collect information describing an amount of data to be ingested for data analytics task 211. For example, collection module 106 may collect information describing a number of files to be analyzed as part of data analytics task 211.

In some examples, collection module 106 may additionally collect information describing one or more user preferences. For example, collection module 106 may receive user input (e.g., from analyst 208) describing a preferred storage platform.

Returning to FIG. 3, at step 306, one or more of the systems described herein may use a self-service provisioning tool to automatically compute, based on the collected information, a suggested type and size of data storage for the data analytics task. For example, computation module 108 may, as part of server 206 in FIG. 2, use self-service provisioning tool 120 to automatically compute, based on the collected information 212, a storage suggestion 214 including a suggested type and size of data storage for data analytics task 211. As used herein, the suggested type and size of data storage may refer to a type and size that self-service provisioning tool 120 has computed as optimal and/or sufficient for the storage needs of data analytics task 211.

In some examples, computation module 108 may operate as part of self-service provisioning tool 120. In other examples, computation module 108 may work in conjunction with self-service provisioning tool 120. In these examples, self-service provisioning tool 120 may compute the suggested type and size of data storage and pass this information to computation module 108.

Self-service provisioning tool 120 may compute the suggested type and size of data storage in a variety of ways. In some examples, self-service provisioning tool 120 may deduce, from information 212, a variety of factors that affect which type and size of storage is optimal for data analytics task 211. For example, self-service provisioning tool 120 may deduce (from information 212) a complexity that the selected data storage must be able to handle. Additionally or alternatively, self-service provisioning tool 120 may deduce (from information 212) a quantity of data that will be used as input for data analytics task 211. Similarly, self-service provisioning tool 120 may deduce (from information 212) how predictable the needed quantity of data will be and/or how variable the quantity of data needed will be over time. In other examples, self-service provisioning tool 120 may deduce how resource intensive performing the functions of data analytics task 211 may be. Using such factors, self-service provisioning tool 120 may compute (and thus identify) a suggested type and size of data storage that is based on (and thereby tailored to) the needs of data analytics task 211.

In one example, self-service provisioning tool 120 may infer (e.g., based on an assumption about analytics in general) that the storage requirements for data analytics task 211 will be short-term. Additionally, self-service provisioning tool 120 may infer (e.g., based on an assumption about analytics in general) that that the analytics data in the short-term storage will be highly accessed. Thus, when self-service provisioning tool 120 computes a suggested type and/or size of storage, self-service provisioning tool 120 may be selecting among various short-term/high-access options without contemplating cheaper long-term storage suitable for less-important or less-frequently accessed data.

Self-service provisioning tool 120 may identify (i.e., based on its computation) a variety of types of storage as potentially optimal and/or sufficient for data analytics task 211. In one example, self-service provisioning tool 120 may identify, as optimal and/or sufficient, an object store with a storage architecture that manages data as objects, each object including data, metadata corresponding to the data, and an identifier. In another example, self-service provisioning tool 120 may identify, as optimal and/or sufficient, a file system that manages data as a file hierarchy. In one such example, self-service provisioning tool 120 may identify, as optimal and/or sufficient, a network file system that may be mounted from another machine, allowing analyst 208 to access remote files as if they resided in a local file directory.

In another example, self-service provisioning tool 120 may identify, as optimal and/or sufficient, a container-based storage system. In one example, self-service provisioning tool 120 may identify, as optimal and/or sufficient, a clustered file system that may be simultaneously mounted on multiple servers but may be managed as a single system. To give a specific example, self-service provisioning tool 120 may identify, as optimal and/or sufficient, a HADOOP distributed file system (HDFS). In some examples, self-service provisioning tool 120 may identify, as optimal and/or sufficient, a particular vendor and/or a specific type of storage from a particular vendor. To give a specific example, self-service provisioning tool 120 may suggest using a NODE-LOCAL-ONLY DOCKER volume.

In some examples, self-service provisioning tool 120 may be tied to a particular storage platform. For example, self-service provisioning tool 120 may operate as part of the service provided by a particular storage platform. In these examples, self-service provisioning tool 120 may select a suggested data storage type from among the available types of storage offered by the particular storage platform.

In one embodiment, after computing storage suggestion 214 (e.g., via self-service provisioning tool 120), computation module 108 may present storage suggestion 214 to a user (e.g., via a display element of self-service provisioning tool 120). In one example, computation module 108 may present storage suggestion 214 to a user responsible for the provisioning request, such as analyst 208. In some examples, computation module 108 may send storage suggestion 214 to the user without requiring the user to identify the type and/or size of storage needed for the data analytics task. In one such example, computation module 108 may allow the user to adjust one or more settings associated with the suggested type and the suggested size of data storage included in storage suggestion 214.

Finally, at step 308, one or more of the systems described herein may provision data storage for the data analytics task based on the suggested type and size. For example, provisioning module 110 may, as part of server 206 in FIG. 2, provision data storage for data analytics task 211 based on the suggested type and size included within storage suggestion 214. Using FIG. 4 as a specific example, provisioning module 110 may provision storage device 410. In some examples, as illustrated in FIG. 4, provisioning module 110 may provision remote storage (e.g., via an instance of network 204). In other examples, provisioning module 110 may provision local storage.

Provisioning module 110 may provision the data storage in response to a variety of triggers. In some examples, provisioning module 110 may provision the data storage in response to self-service provisioning tool 120 completing its computation (e.g., without requiring user input from analyst 208). In other examples, provisioning module 110 may query for the approval of analyst 208 (e.g., via a display element) prior to provisioning the data storage. In these examples, provisioning module 110 may provision the data storage in response to receiving the approval and/or in response to analyst 208 explicitly submitting a request for data storage of the suggested type and/or size. In examples in which analyst 208 adjusted settings associated with the suggested type and/or the suggested size, provisioning module 110 may select data storage for provisioning that reflects the adjustments made by analyst 208.

In examples in which the selected storage utilizes containers, provisioning module 110 may provision the data storage by (1) creating storage of the suggested type and amount and (2) connecting the storage to containers to be used for the data analytics task. In these examples, provisioning module 110 may prepare the containers on a just-in-time basis.

In examples in which analyst 208 adjusted settings associated with the suggested type and/or the suggested amount of data storage, the disclosed systems and methods may alter one or more specifications of self-service provisioning tool 120 based on the adjustments. Thus, based on feedback over time, the intelligence and logic of the self-service provisioning tool may increase, thereby improving self-service provisioning tool 120 over time.

As explained above in connection with example method 300 in FIG. 3, the disclosed systems and methods provide a self-service tool for provisioning storage for analytics (e.g., with clustered containers). In one example, the self-service tool may suggest a size and/or type of storage for an analytics task (e.g., based on information relating to the analytics task that is made accessible to the tool). The self-service tool may rely on a variety of inputs to make its suggestion. One input to the self-service tool may be the type of data being used as input for the analytics task. The data type may be defined in a variety of ways: Is the data stored in ORACLE? Does the data include CSV files? Is the data being stored in a PARQUET format? Is the data stored using MYSQL or CASANDRA?.

Other inputs to the self-service tool may involve peeking into the analytics task (and/or ETL) being done. These inputs may include a type of container being requested by the analyst for the analytics task (e.g., containers that are running SPARK, R, PYTHON, and/or EXCEL). In other examples, these inputs may include features of the functions being performed as part of the analytics task. These inputs may answer pertinent questions: Is the analytics task extracting a tarred, zipped file? Does the code of the program being used for the analytics task have a lot of "write to file" steps? Are they within loops?

Using such inputs, the self-service tool may suggest a type of storage (e.g., an object store, a clustered file system, an NFS mount, a container volume such as a DOCKER volume, etc.) and/or how much storage may be useful for the analytics task. In some examples, an analyst may provide suggestions to the self-service tool by adjusting settings that affect the suggested type and/or amount of storage. Then, the analyst and/or the self-service tool may submit a self-service storage provisioning request for the resulting type and/or amount of storage. The disclosed systems and methods may then create the storage requested in the self-service storage provisioning request and automatically connect the created storage to containers for the analyst to use. In examples in which the analyst provides suggestions to the self-service tool by adjusting settings, the self-service tool may improve itself based on the adjustments to its initial suggestions.

Figure 5:
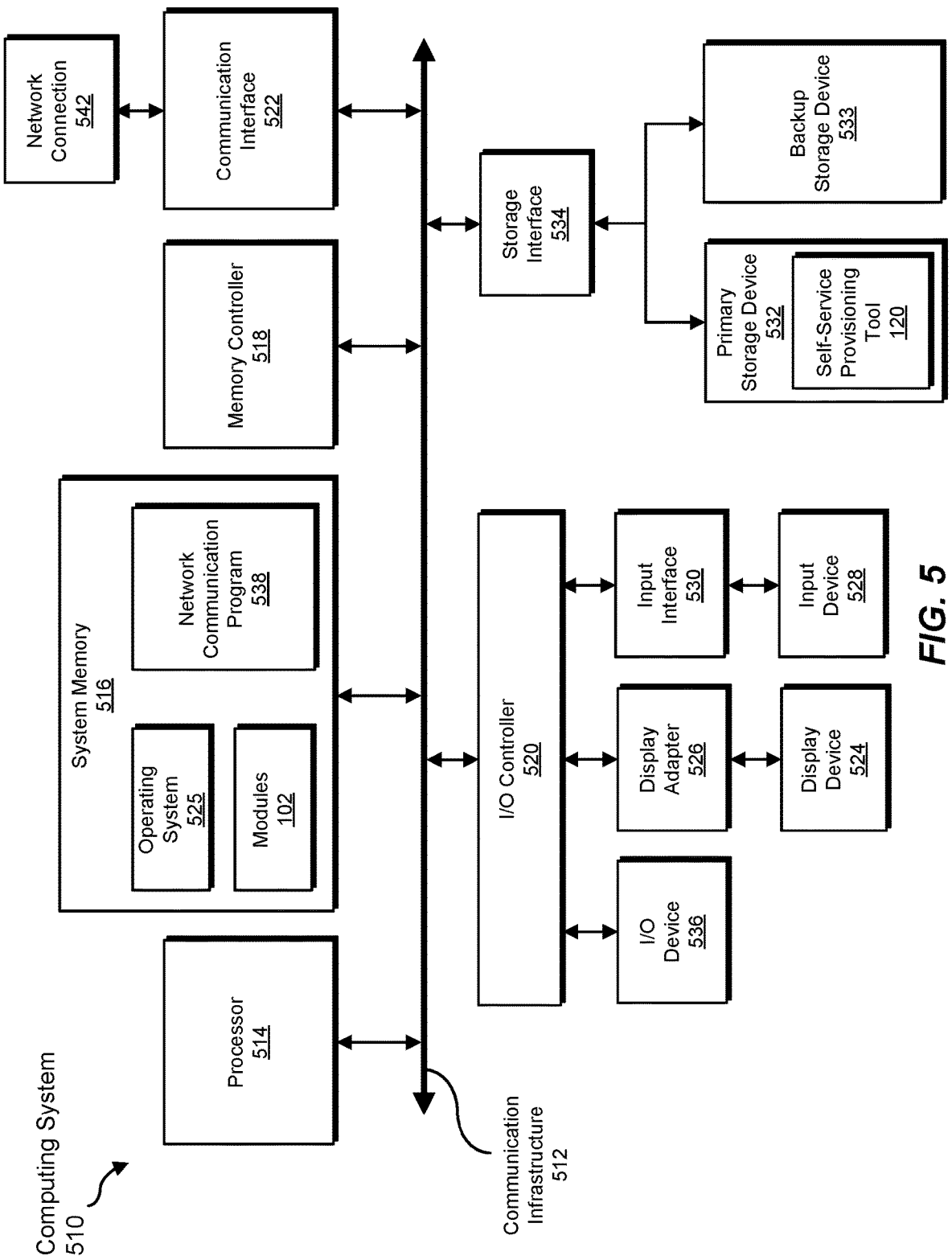
FIG. 5 is a block diagram of an example computing system capable of implementing one or more of the embodiments described and/or illustrated herein.

FIG. 5 is a block diagram of an example computing system 510 capable of implementing one or more of the embodiments described and/or illustrated herein. For example, all or a portion of computing system 510 may perform and/or be a means for performing, either alone or in combination with other elements, one or more of the steps described herein (such as one or more of the steps illustrated in FIG. 3). All or a portion of computing system 510 may also perform and/or be a means for performing any other steps, methods, or processes described and/or illustrated herein.

Computing system 510 broadly represents any single or multi-processor computing device or system capable of executing computer-readable instructions. Examples of computing system 510 include, without limitation, workstations, laptops, client-side terminals, servers, distributed computing systems, handheld devices, or any other computing system or device. In its most basic configuration, computing system 510 may include at least one processor 514 and a system memory 516.

Processor 514 generally represents any type or form of physical processing unit (e.g., a hardware-implemented central processing unit) capable of processing data or interpreting and executing instructions. In certain embodiments, processor 514 may receive instructions from a software application or module. These instructions may cause processor 514 to perform the functions of one or more of the example embodiments described and/or illustrated herein.

System memory 516 generally represents any type or form of volatile or non-volatile storage device or medium capable of storing data and/or other computer-readable instructions. Examples of system memory 516 include, without limitation, Random Access Memory (RAM), Read Only Memory (ROM), flash memory, or any other suitable memory device. Although not required, in certain embodiments computing system 510 may include both a volatile memory unit (such as, for example, system memory 516) and a non-volatile storage device (such as, for example, primary storage device 532, as described in detail below). In one example, one or more of modules 102 from FIG. 1 may be loaded into system memory 516.

In some examples, system memory 516 may store and/or load an operating system 525 for execution by processor 514. In one example, operating system 525 may include and/or represent software that manages computer hardware and software resources and/or provides common services to computer programs and/or applications on computing system 510. Examples of operating system 624 include, without limitation, LINUX, JUNOS, MICROSOFT WINDOWS, WINDOWS MOBILE, MAC OS, APPLE'S IOS, UNIX, GOOGLE CHROME OS, GOOGLE'S ANDROID, SOLARIS, variations of one or more of the same, and/or any other suitable operating system.

In certain embodiments, example computing system 510 may also include one or more components or elements in addition to processor 514 and system memory 516. For example, as illustrated in FIG. 5, computing system 510 may include a memory controller 518, an Input/Output (I/O) controller 520, and a communication interface 522, each of which may be interconnected via a communication infrastructure 512. Communication infrastructure 512 generally represents any type or form of infrastructure capable of facilitating communication between one or more components of a computing device. Examples of communication infrastructure 512 include, without limitation, a communication bus (such as an Industry Standard Architecture (ISA), Peripheral Component Interconnect (PCI), PCI Express (PCIe), or similar bus) and a network.

Memory controller 518 generally represents any type or form of device capable of handling memory or data or controlling communication between one or more components of computing system 510. For example, in certain embodiments memory controller 518 may control communication between processor 514, system memory 516, and I/O controller 520 via communication infrastructure 512.

I/O controller 520 generally represents any type or form of module capable of coordinating and/or controlling the input and output functions of a computing device. For example, in certain embodiments I/O controller 520 may control or facilitate transfer of data between one or more elements of computing system 510, such as processor 514, system memory 516, communication interface 522, display adapter 526, input interface 530, and storage interface 534.

As illustrated in FIG. 5, computing system 510 may also include at least one display device 524 coupled to I/O controller 520 via a display adapter 526. Display device 524 generally represents any type or form of device capable of visually displaying information forwarded by display adapter 526. Similarly, display adapter 526 generally represents any type or form of device configured to forward graphics, text, and other data from communication infrastructure 512 (or from a frame buffer, as known in the art) for display on display device 524.

As illustrated in FIG. 5, example computing system 510 may also include at least one input device 528 coupled to I/O controller 520 via an input interface 530. Input device 528 generally represents any type or form of input device capable of providing input, either computer or human generated, to example computing system 510. Examples of input device 528 include, without limitation, a keyboard, a pointing device, a speech recognition device, variations or combinations of one or more of the same, and/or any other input device.

Additionally or alternatively, example computing system 510 may include additional I/O devices. For example, example computing system 510 may include I/O device 536. In this example, I/O device 536 may include and/or represent a user interface that facilitates human interaction with computing system 510. Examples of I/O device 536 include, without limitation, a computer mouse, a keyboard, a monitor, a printer, a modem, a camera, a scanner, a microphone, a touchscreen device, variations or combinations of one or more of the same, and/or any other I/O device.

Communication interface 522 broadly represents any type or form of communication device or adapter capable of facilitating communication between example computing system 510 and one or more additional devices. For example, in certain embodiments communication interface 522 may facilitate communication between computing system 510 and a private or public network including additional computing systems. Examples of communication interface 522 include, without limitation, a wired network interface (such as a network interface card), a wireless network interface (such as a wireless network interface card), a modem, and any other suitable interface. In at least one embodiment, communication interface 522 may provide a direct connection to a remote server via a direct link to a network, such as the Internet. Communication interface 522 may also indirectly provide such a connection through, for example, a local area network (such as an Ethernet network), a personal area network, a telephone or cable network, a cellular telephone connection, a satellite data connection, or any other suitable connection.

In certain embodiments, communication interface 522 may also represent a host adapter configured to facilitate communication between computing system 510 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 522 may also allow computing system 510 to engage in distributed or remote computing. For example, communication interface 522 may receive instructions from a remote device or send instructions to a remote device for execution.

In some examples, system memory 516 may store and/or load a network communication program 538 for execution by processor 514. In one example, network communication program 538 may include and/or represent software that enables computing system 510 to establish a network connection 542 with another computing system (not illustrated in FIG. 5) and/or communicate with the other computing system by way of communication interface 522. In this example, network communication program 538 may direct the flow of outgoing traffic that is sent to the other computing system via network connection 542. Additionally or alternatively, network communication program 538 may direct the processing of incoming traffic that is received from the other computing system via network connection 542 in connection with processor 514.

Although not illustrated in this way in FIG. 5, network communication program 538 may alternatively be stored and/or loaded in communication interface 522. For example, network communication program 538 may include and/or represent at least a portion of software and/or firmware that is executed by a processor and/or Application Specific Integrated Circuit (ASIC) incorporated in communication interface 522.

As illustrated in FIG. 5, example computing system 510 may also include a primary storage device 532 and a backup storage device 533 coupled to communication infrastructure 512 via a storage interface 534. Storage devices 532 and 533 generally represent any type or form of storage device or medium capable of storing data and/or other computer-readable instructions. For example, storage devices 532 and 533 may be a magnetic disk drive (e.g., a so-called hard drive), a solid state drive, a floppy disk drive, a magnetic tape drive, an optical disk drive, a flash drive, or the like. Storage interface 534 generally represents any type or form of interface or device for transferring data between storage devices 532 and 533 and other components of computing system 510. In one example, self-service provisioning tool 120 from FIG. 1 may be stored and/or loaded in primary storage device 532.

In certain embodiments, storage devices 532 and 533 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 532 and 533 may also include other similar structures or devices for allowing computer software, data, or other computer-readable instructions to be loaded into computing system 510. For example, storage devices 532 and 533 may be configured to read and write software, data, or other computer-readable information. Storage devices 532 and 533 may also be a part of computing system 510 or may be a separate device accessed through other interface systems.

Many other devices or subsystems may be connected to computing system 510. Conversely, all of the components and devices illustrated in FIG. 5 need not be present to practice the embodiments described and/or illustrated herein. The devices and subsystems referenced above may also be interconnected in different ways from that shown in FIG. 5. Computing system 510 may also employ any number of software, firmware, and/or hardware configurations. For example, one or more of the example embodiments disclosed herein may be encoded as a computer program (also referred to as computer software, software applications, computer-readable instructions, or computer control logic) on a computer-readable medium. The term "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The computer-readable medium containing the computer program may be loaded into computing system 510. All or a portion of the computer program stored on the computer-readable medium may then be stored in system memory 516 and/or various portions of storage devices 532 and 533. When executed by processor 514, a computer program loaded into computing system 510 may cause processor 514 to perform and/or be a means for performing the functions of one or more of the example embodiments described and/or illustrated herein. Additionally or alternatively, one or more of the example embodiments described and/or illustrated herein may be implemented in firmware and/or hardware. For example, computing system 510 may be configured as an Application Specific Integrated Circuit (ASIC) adapted to implement one or more of the example embodiments disclosed herein.

Figure 6:
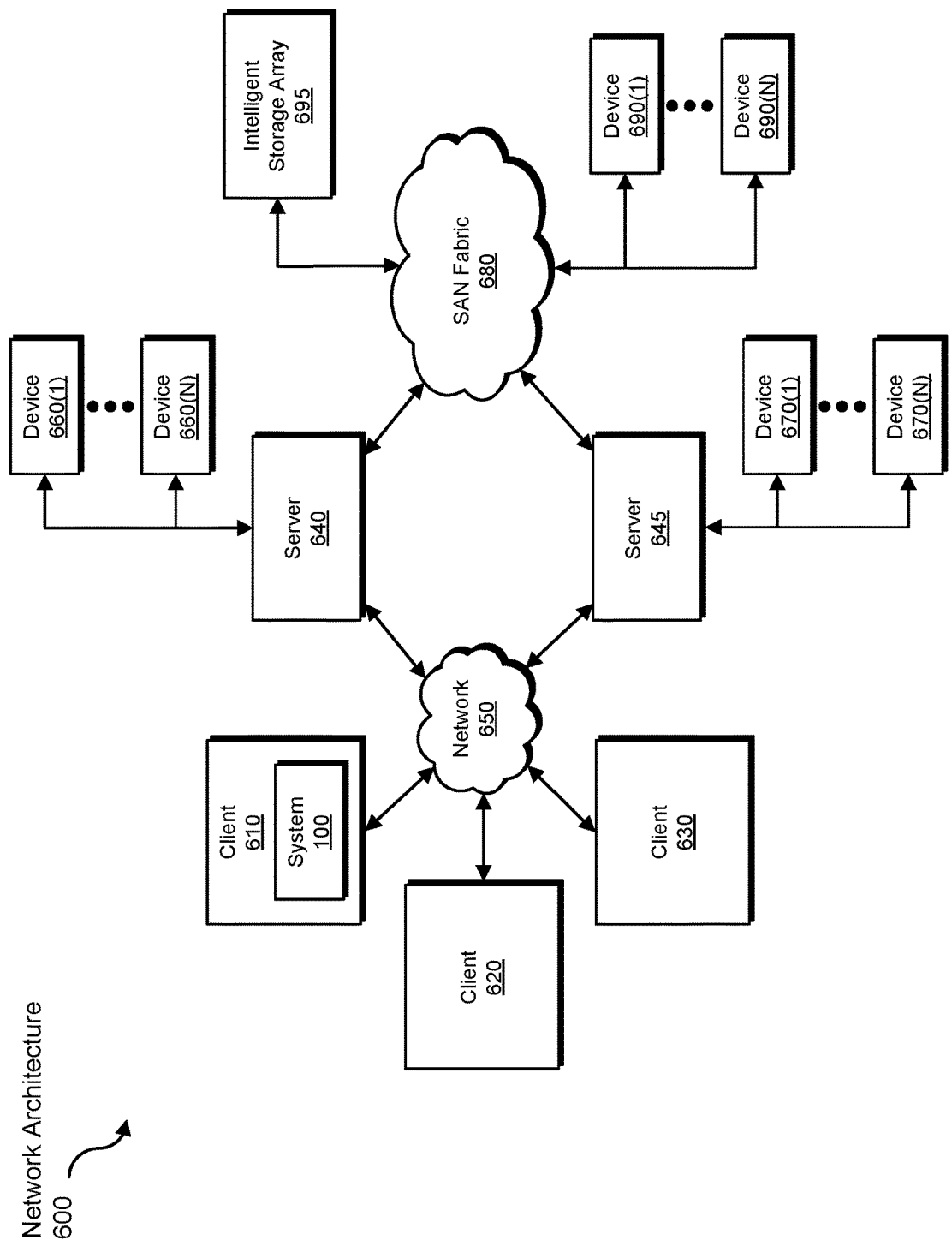
FIG. 6 is a block diagram of an example computing network capable of implementing one or more of the embodiments described and/or illustrated herein.

FIG. 6 is a block diagram of an example network architecture 600 in which client systems 610, 620, and 630 and servers 640 and 645 may be coupled to a network 650. As detailed above, all or a portion of network architecture 600 may perform and/or be a means for performing, either alone or in combination with other elements, one or more of the steps disclosed herein (such as one or more of the steps illustrated in FIG. 3). All or a portion of network architecture 600 may also be used to perform and/or be a means for performing other steps and features set forth in the instant disclosure.

Client systems 610, 620, and 630 generally represent any type or form of computing device or system, such as example computing system 510 in FIG. 5. Similarly, servers 640 and 645 generally represent computing devices or systems, such as application servers or database servers, configured to provide various database services and/or run certain software applications. Network 650 generally represents any telecommunication or computer network including, for example, an intranet, a WAN, a LAN, a PAN, or the Internet. In one example, client systems 610, 620, and/or 630 and/or servers 640 and/or 645 may include all or a portion of system 100 from FIG. 1.

As illustrated in FIG. 6, one or more storage devices 660(1)-(N) may be directly attached to server 640. Similarly, one or more storage devices 670(1)-(N) may be directly attached to server 645. Storage devices 660(1)-(N) and storage devices 670(1)-(N) generally represent any type or form of storage device or medium capable of storing data and/or other computer-readable instructions. In certain embodiments, storage devices 660(1)-(N) and storage devices 670(1)-(N) may represent Network-Attached Storage (NAS) devices configured to communicate with servers 640 and 645 using various protocols, such as Network File System (NFS), Server Message Block (SMB), or Common Internet File System (CIFS).

Servers 640 and 645 may also be connected to a Storage Area Network (SAN) fabric 680. SAN fabric 680 generally represents any type or form of computer network or architecture capable of facilitating communication between a plurality of storage devices. SAN fabric 680 may facilitate communication between servers 640 and 645 and a plurality of storage devices 690(1)-(N) and/or an intelligent storage array 695. SAN fabric 680 may also facilitate, via network 650 and servers 640 and 645, communication between client systems 610, 620, and 630 and storage devices 690(1)-(N) and/or intelligent storage array 695 in such a manner that devices 690(1)-(N) and array 695 appear as locally attached devices to client systems 610, 620, and 630. As with storage devices 660(1)-(N) and storage devices 670(1)-(N), storage devices 690(1)-(N) and intelligent storage array 695 generally represent any type or form of storage device or medium capable of storing data and/or other computer-readable instructions.

In certain embodiments, and with reference to example computing system 510 of FIG. 5, a communication interface, such as communication interface 522 in FIG. 5, may be used to provide connectivity between each client system 610, 620, and 630 and network 650. Client systems 610, 620, and 630 may be able to access information on server 640 or 645 using, for example, a web browser or other client software. Such software may allow client systems 610, 620, and 630 to access data hosted by server 640, server 645, storage devices 660(1)-(N), storage devices 670(1)-(N), storage devices 690(1)-(N), or intelligent storage array 695. Although FIG. 6 depicts the use of a network (such as the Internet) for exchanging data, the embodiments described and/or illustrated herein are not limited to the Internet or any particular network-based environment.

In at least one embodiment, all or a portion of one or more of the example embodiments disclosed herein may be encoded as a computer program and loaded onto and executed by server 640, server 645, storage devices 660(1)-(N), storage devices 670(1)-(N), storage devices 690(1)-(N), intelligent storage array 695, or any combination thereof. All or a portion of one or more of the example embodiments disclosed herein may also be encoded as a computer program, stored in server 640, run by server 645, and distributed to client systems 610, 620, and 630 over network 650.

As detailed above, computing system 510 and/or one or more components of network architecture 600 may perform and/or be a means for performing, either alone or in combination with other elements, one or more steps of an example method for automatically linking data analytics to storage.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered example in nature since many other architectures can be implemented to achieve the same functionality.

In some examples, all or a portion of example system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of example system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of example system 100 in FIG. 1 may be implemented within a virtual environment. For example, the modules and/or data described herein may reside and/or execute within a virtual machine. As used herein, the term "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the term "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

In some examples, all or a portion of example system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), and the like. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

In addition, all or a portion of example system 100 in FIG. 1 may represent portions of, interact with, consume data produced by, and/or produce data consumed by one or more systems for information management. As used herein, the term "information management" may refer to the protection, organization, and/or storage of data. Examples of systems for information management may include, without limitation, storage systems, backup systems, archival systems, replication systems, high availability systems, data search systems, virtualization systems, and the like.

In some embodiments, all or a portion of example system 100 in FIG. 1 may represent portions of, produce data protected by, and/or communicate with one or more systems for information security. As used herein, the term "information security" may refer to the control of access to protected data. Examples of systems for information security may include, without limitation, systems providing managed security services, data loss prevention systems, identity authentication systems, access control systems, encryption systems, policy compliance systems, intrusion detection and prevention systems, electronic discovery systems, and the like.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various example methods described and/or illustrated herein may also omit one or more of the steps described or illustrated herein or include additional steps in addition to those disclosed.

While various embodiments have been described and/or illustrated herein in the context of fully functional computing systems, one or more of these example embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the example embodiments disclosed herein.

In addition, one or more of the modules described herein may transform data, physical devices, and/or representations of physical devices from one form to another. For example, one or more of the modules recited herein may receive data relating to a data analytics task and transform the data into a storage provisioning recommendation. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the example embodiments disclosed herein. This example description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method for automatically linking data analytics to storage, at least a portion of the method being performed by a computing device comprising at least one processor, the method comprising:
    identifying one or more requests to provision storage within a container-based environment for a plurality of data analytics tasks comprising a first data analytics task, a second data analytics task, and a third data analytics task, the one or more requests to provision storage comprising one or more requests to provision containers within the container-based environment;
    collecting information relating to each of the data analytics tasks, the information comprising:
        a data type of the data being used as input for the data analytics task, the data type comprising a file format of the data and a source of the data; and
        a characteristic of the data analytics task;
    using a self-service provisioning tool to automatically compute, based on the collected information, a suggested type and size of data storage for each of the data analytics tasks, wherein computing the suggested type and size of data storage comprises:
        suggesting for the first data analytics task, based on the information collected for the first data analytics task, an object store within a storage architecture that manages data as objects;
        suggesting for the second data analytics task, based on the information collected for the second data analytics task, a file system that manages data as a file hierarchy; and
        suggesting for the third data analytics task, based on the information collected for the third data analytics task, a clustered file system configured to be simultaneously mounted on multiple servers but managed as a single system; and
    automatically provisioning data storage for each of the data analytics tasks, based on the suggested type and size, by (1) automatically provisioning the object store for the first data analytics task, (2) automatically provisioning the file system for the second data analytics task, and (3) automatically provisioning the clustered file system for the third data analytics task, wherein automatically provisioning the data storage for each of the data analytics tasks comprises creating the data storage of the suggested type and size for each of the data analytics tasks and connecting the data storage of the suggested type and size to one or more containers within the container-based environment to be used for the data analytics task.

2. The computer-implemented method of claim 1, wherein the requests to provision storage for the data analytics tasks comprises, for at least one of the data analytics tasks, a request to provision at least one of:
    scratch space to hold intermediate analytic results; and
    storage for copy data.

3. The computer-implemented method of claim 1, wherein identifying the requests to provision storage for the data analytics tasks comprises at least one of:
- receiving a request from an analyst via user input submitted by the analyst; and
- receiving a request from a data analytics tool being used to perform a data analytics task.

4. The computer-implemented method of claim 1, wherein identifying the requests to provision storage for the data analytics tasks comprises, for at least one of the data analytics tasks, inferring a request in response to determining that an analyst has digitally initiated a task that requires data storage.

5. The computer-implemented method of claim 1, wherein the steps of the method are performed by at least one of:
- the self-service provisioning tool; and
- a data analytics tool.

6. The computer-implemented method of claim 1, wherein collecting information relating to each of the data analytics tasks comprises, for at least one of the data analytics tasks, collecting the information in response to prompting a user to submit the information.

7. The computer-implemented method of claim 1, wherein collecting information relating to each of the data analytics tasks comprises, for at least one of the data analytics tasks, inferring the information based on attributes of at least one of:
- the data analytics task; and
- a data analytics tool being used to perform the data analytics task.

8. The computer-implemented method of claim 1, wherein the data type of the data further comprises a structure of the data.

9. The computer-implemented method of claim 1, wherein the characteristic of the data analytics task comprises at least one of:
- a type of data analytics being performed;
- a programming language of a data analytics application performing the data analytics task;
- extract, transform, and load (ETL) functions to be performed as part of the data analytics task; and
- an amount of data to be ingested for the data analytics task.

10. The computer-implemented method of claim 1, wherein the characteristic of the data analytics task comprises a feature of the code used by a data analytics application performing the data analytics task.

11. The computer-implemented method of claim 1, further comprising, for each of the data analytics tasks, after computing the suggested type and size of data storage, presenting the suggested type and size of data storage to an analyst via a display element of a device associated with the analyst.

12. The computer-implemented method of claim 11, further comprising:
- after presenting the suggested type and size of data storage, allowing the analyst to adjust one or more settings associated with at least one of the suggested type and the suggested size;
- wherein automatically provisioning the data storage is further based on the analyst's adjustments.

13. The computer-implemented method of claim 12, further comprising altering one or more specifications of the self-service provisioning tool based on the analyst's adjustments.

14. The computer-implemented method of claim 1, wherein automatically provisioning the data storage for each of the data analytics tasks comprises provisioning the data storage of the suggested type and size without requiring user input.

15. A system for automatically linking data analytics to storage, the system comprising:
- a request module, stored in memory, that identifies one or more requests to provision storage within a container-based environment for a plurality of data analytics tasks comprising a first data analytics task, a second data analytics task, and a third data analytics task, the one or more requests to provision storage comprising one or more requests to provision containers within the container-based environment;
- a collection module, stored in memory, that collects information relating to each of the data analytics tasks, the information comprising:
  - a data type of the data being used as input for the data analytics task, the data type comprising a file format of the data and a source of the data; and
  - a characteristic of the data analytics task;
- a computation module, stored in memory, that uses a self-service provisioning tool to automatically compute, based on the collected information, a suggested type and size of data storage for each of the data analytics tasks, wherein computing the type and size of data storage comprises:
  - suggesting for the first data analytics task, based on the information collected for the first data analytics task, an object store within a storage architecture that manages data as objects;
  - suggesting for the second data analytics task, based on the information collected for the second data analytics task, a file system that manages data as a file hierarchy; and
  - suggesting for the third data analytics task, based on the information collected for the third data analytics task, a clustered file system configured to be simultaneously mounted on multiple servers but managed as a single system;
- a provisioning module, stored in memory, that automatically provisions data storage for each the data analytics tasks, based on the suggested type and size, by (1) automatically provisioning the object store for the first data analytics task, (2) automatically provisioning the file system for the second data analytics task, and (3) automatically provisioning the clustered file system for the third data analytics task, wherein automatically provisioning the data storage for each of the data analytics tasks comprises creating the data storage of the suggested type and size for each of the data analytics tasks and connecting the data storage of the suggested type and size to one or more containers within the container-based environment to be used for the data analytics task; and
- at least one physical processor configured to execute the request module, the collection module, the computation module, and the provisioning module.

16. The system of claim 15, wherein the requests to provision storage for the data analytics tasks comprises, for at least one of the data analytics tasks, a request to provision at least one of:
- scratch space to hold intermediate analytic results; and
- storage for copy data.

17. The system of claim 15, wherein request module identifies the requests to provision storage for the data analytics tasks by at least one of:

receiving a request from an analyst via user input submitted by the analyst; and receiving a request from a data analytics tool being used to perform the data analytics task.

18. The system of claim 15, wherein request module identifies the requests to provision storage for the data analytics tasks by, for at least one of the data analytics tasks, inferring a request in response to determining that an analyst has digitally initiated a task that requires data storage.

19. The system of claim 15, wherein the data type of the data further comprises a structure of the data.

20. A non-transitory computer-readable medium comprising one or more computer-readable instructions that, when executed by at least one processor of a computing device, cause the computing device to:

identify one or more requests to provision storage within a container-based environment for a plurality of data analytics tasks comprising a first data analytics task, a second data analytics task, and a third data analytics task, the one or more requests to provision storage comprising one or more requests to provision containers within the container-based environment;

collect information relating to each of the data analytics tasks, the information comprising:

a data type of the data being used as input for the data analytics task, the data type comprising a file format of the data and a source of the data; and a characteristic of the data analytics task;

use a self-service provisioning tool to automatically compute, based on the collected information, a suggested type and size of data storage for each of the data analytics tasks, wherein computing the suggested type and size of data storage comprises:

suggesting for the first data analytics task, based on the information collected for the first data analytics task, an object store within a storage architecture that manages data as objects;

suggesting for the second data analytics task, based on the information collected for the second data analytics task, a file system that manages data as a file hierarchy; and suggesting for the third data analytics task, based on the information collected for the third data analytics task, a clustered file system configured to be simultaneously mounted on multiple servers but managed as a single system; and automatically provision data storage for each of the data analytics tasks, based on the suggested type and size, by (1) automatically provisioning the object store for the first data analytics task, (2) automatically provisioning the file system for the second data analytics task, and (3) automatically provisioning the clustered file system for the third data analytics task, wherein automatically provisioning the data storage for each of the data analytics tasks comprises creating the data storage of the suggested type and size for each of the data analytics tasks and connecting the data storage of the suggested type and size to one or more containers within the container-based environment to be used for the data analytics task.

* * * * *